(12) United States Patent
Nishimura et al.

(10) Patent No.: US 12,298,799 B2
(45) Date of Patent: May 13, 2025

(54) PEDAL DEVICE

(71) Applicant: DENSO CORPORATION, Kariya (JP)

(72) Inventors: Atsushi Nishimura, Kariya (JP); Etsugo Yanagida, Kariya (JP); Yuki Matsunaga, Kariya (JP); Daisuke Hokuto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/500,962

(22) Filed: Nov. 2, 2023

(65) Prior Publication Data

US 2024/0061461 A1    Feb. 22, 2024

Related U.S. Application Data

(63) Continuation of application No. PCT/JP2022/013795, filed on Mar. 24, 2022.

(30) Foreign Application Priority Data

May 14, 2021  (JP) ................................ 2021-082797

(51) Int. Cl.
*G05G 1/30* (2008.04)
*B60T 7/04* (2006.01)
(Continued)

(52) U.S. Cl.
CPC ................. *G05G 1/44* (2013.01); *B60T 7/06* (2013.01); *G05G 5/03* (2013.01); *G05G 5/04* (2013.01); *B60T 7/042* (2013.01); *G05G 2505/00* (2013.01)

(58) Field of Classification Search
CPC .. G05G 1/30; G05G 1/44; G05G 5/03; G05G 5/04; G05G 5/05; G05G 2505/00;
(Continued)

(56) References Cited

U.S. PATENT DOCUMENTS 8,001,870 B2 *  8/2011  Saito ..................... G05G 1/38
                                              74/513
10,303,199 B2 *  5/2019  Neubauer ............... G05G 1/44
(Continued)

FOREIGN PATENT DOCUMENTS

CN     109511262 B  *  8/2021  ............ B60K 26/02
CN     118613404 A  *  9/2024
(Continued)

OTHER PUBLICATIONS

U.S. Appl. No. 18/500,944 to Masashi Arao, filed Nov. 2, 2023 (94 pages).

(Continued)

*Primary Examiner* — Adam D Rogers
(74) *Attorney, Agent, or Firm* — Nixon & Vanderhye P.C.

(57) ABSTRACT

A pedal device to be pedaled by a user includes: a pedal supported to be swingable about an axis and to swing toward one side in a circumferential direction about the axis when being pedaled by the user; a housing; a reaction force generation portion disposed in the housing and to apply a force to the pedal toward another side in the circumferential direction; and a stopper. The stopper is arranged outside the housing, to swing about the axis together with the pedal while being supported by the pedal, and to stop the pedal by coming into contact with the housing in a non-pedaled state in which the pedal is not pedaled by the user.

14 Claims, 11 Drawing Sheets

(51) Int. Cl.
*B60T 7/06* (2006.01)
*G05G 1/44* (2008.04)
*G05G 5/03* (2008.04)
*G05G 5/04* (2006.01)

(58) Field of Classification Search
CPC .. B60T 7/04; B60T 7/06; B60K 26/02; B60K 26/021
See application file for complete search history.

(56) References Cited

U.S. PATENT DOCUMENTS

| | | | |
|---|---|---|---|
| 2014/0117602 | A1 | 5/2014 | Jeon |
| 2018/0275712 | A1 | 9/2018 | Isono |
| 2021/0370769 | A1 | 12/2021 | Kita et al. |
| 2024/0059143 | A1* | 2/2024 | Ito ............... G05G 1/44 |
| 2024/0059260 | A1* | 2/2024 | Ito ............... B60T 8/17 |
| 2024/0059261 | A1* | 2/2024 | Hokuto ......... B60T 8/17 |
| 2024/0059262 | A1* | 2/2024 | Hokuto ......... B60T 8/17 |
| 2024/0061462 | A1* | 2/2024 | Fukuda ......... G05G 5/05 |
| 2024/0069587 | A1* | 2/2024 | Fukuda ......... G05G 1/44 |
| 2024/0069588 | A1* | 2/2024 | Arao ............. B60T 7/06 |
| 2024/0201725 | A1* | 6/2024 | Arao ............. G05G 1/30 |
| 2024/0294147 | A1* | 9/2024 | Nishimura ..... G05G 1/30 |

FOREIGN PATENT DOCUMENTS

| | | |
|---|---|---|
| JP | 6450131 U | 3/1989 |
| JP | S6450131 U | 3/1989 |
| JP | 2003165426 A | 6/2003 |
| JP | 2004108214 A | 4/2004 |
| JP | 2004189115 A | 7/2004 |
| JP | 2012082725 A | 4/2012 |
| JP | 2012218647 A | 11/2012 |
| JP | 2017049892 A | 3/2017 |
| JP | 2019067005 A | 4/2019 |
| WO | WO-2019037835 A1 * | 2/2019 ........... B60K 26/021 |

OTHER PUBLICATIONS

U.S. Appl. No. 18/500,853 to Yasuhisa Fukuda et al., filed Nov. 2, 2023 (117 pages).
U.S. Appl. No. 18/501,607 to Daisuke Hokuto et al., filed Nov. 3, 2023 (75 pages).
U.S. Appl. No. 18/500,775 to Daisuke Hokuto, filed Nov. 2, 2023 (73 pages).
U.S. Appl. No. 18/501,718 to Yasuhisa Fukuda, filed Nov. 3, 2023 (58 pages).
U.S. Appl. No. 18/500,599 to Kengo Ito et al., filed Nov. 2, 2023 (49 pages).
U.S. Appl. No. 18/500,573 to Kengo Ito et al., filed Nov. 2, 2023 (51 pages).

* cited by examiner

// PEDAL DEVICE

CROSS REFERENCE TO RELATED APPLICATION

The present application is a continuation application of International Patent Application No. PCT/JP2022/013795 filed on Mar. 24, 2022, which designated the U.S. and claims the benefit of priority from Japanese Patent Application No. 2021-082797 filed on May 14, 2021. The entire disclosures of all of the above applications are incorporated herein by reference.

TECHNICAL FIELD

The present disclosure generally relates to a pedal device.

BACKGROUND

Conventionally, a pedal device has been proposed, which includes a pedal that is swingable when being stepped on by a driver, an arm that is arranged below the pedal and swings together with the pedal, and a housing that houses the arm.

SUMMARY

According to an aspect of the present disclosure, a pedal device to be pedaled by a user includes: a pedal supported to be swingable about an axis and to swing toward one side in a circumferential direction about the axis when being pedaled by the user; a housing; a reaction force generation portion disposed in the housing and to apply a force to the pedal toward an another side in the circumferential direction; and a stopper arranged outside the housing, to swing about the axis together with the pedal while being supported by the pedal, and to stop the pedal by contacting the housing in a non-pedaled state in which the pedal is not pedaled by the user.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
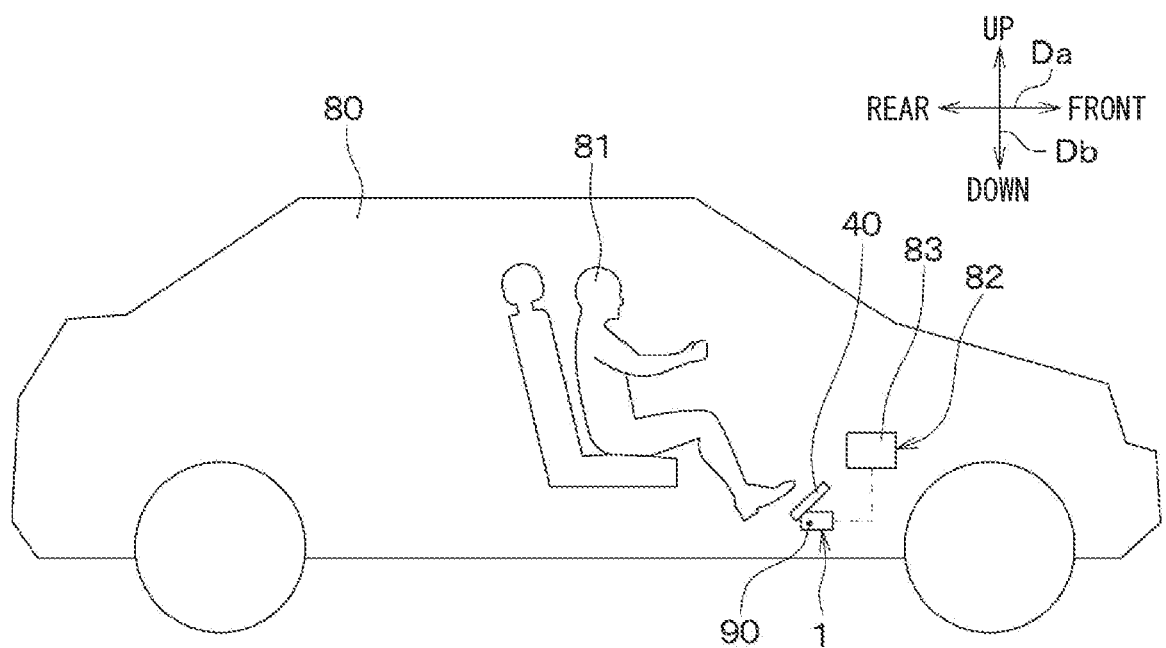
FIG. 1 is a schematic diagram showing a schematic configuration of a pedal device and a brake-by-wire system mounted on an automobile according to a first embodiment.

In a pedal device, a reaction force generation mechanism, made of a spring or the like, may be provided in a housing to generate a force applied to a pedal in opposition to a pedaling force applied to the pedal by a driver.

In the housing, a stopper is provided above the reaction force generation mechanism to stop the pedal by coming into contact with a stopper of the arm when the pedal is not stepped by the driver.

In the pedal device described above, the stopper in the housing comes into contact with the stopper of the arm to stop the pedal when the pedal is not stepped on by the driver. According to the inventor's study, when the stopper in the housing repeatedly contacts the stopper of the arm, the stopper may wear and may generate abrasion powder, and there is a risk for the abrasion powder to give adverse effects to the reaction force generation mechanism.

It is an object of the present disclosure to provide a pedal device that suppresses adverse effects of abrasion powder on a reaction force generation portion.

According to one aspect of the present disclosure, a pedal device to be pedaled by a user includes: a pedal supported to be swingable about an axis and to swing toward one side in a circumferential direction about the axis when being pedaled by the user; a housing; a reaction force generation portion disposed in the housing and to apply a force to the pedal toward an another side in the circumferential direction; and a stopper arranged outside the housing, to swing about the axis together with the pedal while being supported by the pedal, and to stop the pedal by coming into contact with the housing in a non-pedaled state in which the pedal is not pedaled by the user.

Therefore, the stopper can be isolated and separated from the reaction force generation portion by the housing. Thus, even when the stopper repeatedly contacts the housing, and the stopper or the housing wears and abrasion powder is generated, the abrasion powder is isolated from the reaction force generation portion by the housing. Accordingly, it is possible to provide a pedal device that suppresses an adverse effects of abrasion powder on the reaction force generation portion.

Hereinafter, embodiments of the present disclosure will be described with reference to the drawings. In the following embodiments, the same or equivalent parts are assigned with the same reference numerals, among which basically one instance is described in detail for simplifying descriptions.

First Embodiment

As shown in FIG. 1, a pedal device 1 of the present embodiment is a device mounted on an automobile 80 and is pedaled by a pedaling force of a driver 81 who is an occupant of the automobile 80. The pedal device 1 is provided in the automobile 80 as a brake pedal device for performing a braking operation for braking the automobile 80.

Specifically, the automobile 80 of FIG. 1 employs a brake-by-wire system 82, and the pedal device 1 is a brake pedal device used in the brake-by-wire system 82. The brake-by-wire system 82 is a system that drives brake pads of each of wheels via a brake circuit with hydraulic pressure generated by a master cylinder under drive control of an electronic control device 83 mounted on the automobile 80, based on an electrical signal output from the pedal device 1.

Four arrows in FIG. 1 respectively indicate a direction of the automobile 80 on which the pedal device 1 is mounted. A travel direction Da of the automobile 80 and an up-down direction Db of the automobile 80 (in other words, a vertical direction of the vehicle 80) are indicated by four arrows. Further, in the description of the present embodiment, a front side in the travel direction Da of the vehicle is also referred to as a vehicle front side in the travel direction, and a rear side in the travel direction Da of the vehicle is also referred to as a vehicle rear side in the travel direction. An upper side in the vertical direction Db of the vehicle is also called as a vehicle upper side, and a lower side in the vertical direction Db of the vehicle is also called as a vehicle lower side.

As shown in FIGS. 1, 2, 3, 4, and 5, the pedal device 1 includes a housing 10, a rotating shaft 31, an arm 32, a pedal 40, a reaction force generation mechanism 60, a rod 76, and a rotation angle sensor 90 or the like. The pedal device 1 of the present embodiment is an organ-type pedal device.

In the organ-type pedal device 1, a portion of the pedal 40 that is stepped by the driver 81 is arranged in an upper part of the vehicle with respect to a swing center CL of the pedal 40 (that is, above in the vertical direction when mounted on the vehicle). In the organ-type pedal device 1, the more the pedaling force applied to the pedal 40 by the driver 81 increases, the more the portion of the pedal 40 that is in an upper part of the vehicle with respect to the swing center CL of the pedal 40 swings toward the floor 2 or toward a dash panel in a vehicle compartment. Note that the swing center CL of the pedal 40 is a rotation center of swinging move of the pedal 40. Further, in the description of the present embodiment, the swing center CL of the pedal 40 is also referred to as a pedal axis CL.

The housing 10 is made of a housing body 10A and a base plate 10B. Inside the housing body 10A, a housing space is formed as an internal space. The housing body 10A has an opening that opens from the housing space toward the vehicle lower side.

The base plate 10B is arranged to close the opening of the housing body 10A from the vehicle lower side. The housing body 10A is attached to the floor 2, the dash panel, or the like, which is a part of a vehicle body, via the base plate 10B. That is, the housing 10 and the base plate 10B form a non-rotating member that is fixed to the vehicle body and does not rotate.

The housing body 10A and the base plate 10B are integrally fixed and fixed to the floor 2. For example, the housing body 10A is fixed to the base plate 10B by bolting or the like, and the base plate 10B is fixed to the floor 2 by bolting or the like.

The housing body 10A and the base plate 10B are attached to the floor 2 in the above-described manner. The housing body 10A and the base plate 10B function as a support for supporting the pedal 40, the reaction force generation mechanism 60, or the like. Note that the floor 2 constitutes a floor of the vehicle compartment. Also, the dash panel is a partition wall that separates an exterior of the vehicle such as an engine room of the automobile 80 from an interior of the vehicle, and is sometimes called as a bulkhead.

The reaction force generation mechanism 60 or the like are provided in the housing space of the housing body 10A.

The base plate 10B is, for example, a plate-like member, and is provided on one side of the housing body 10A opposite to a pedal 40 side. That is, the base plate 10B is provided on a floor 2 side with respect to the housing body 10A, and is sandwiched between the housing body 10A and the floor 2 in a vehicle mounted state in which the pedal device 1 is attached to the floor 2.

The base plate 10B continuously extends from a vehicle front side portion to a vehicle rear side portion of the housing body 10A, and is fixed to the floor 2 of the automobile 80 by bolts or the like as described above. The housing body 10A and the base plate 10B are made of, for example, a metal material.

The rotating shaft 31 is rotatably supported by the housing body 10A. Specifically, the housing body 10A has, formed thereon, a rotating shaft hole extending in an axial direction of the pedal axis CL which is centered on the pedal axis CL, and the rotating shaft 31 is inserted into the rotating shaft hole.

The rotation angle sensor 90 is attached to the housing body 10A. As the rotation angle sensor 90, for example, a magnetic sensor circuit using a Hall element or a magneto resistive element, or an optical sensor circuit using a rotary encoder or the like can be used.

The rotation angle sensor 90 detects a rotation angle of the rotating shaft 31 and outputs an electrical signal indicating the rotation angle of the rotating shaft 31 to an electronic control device 83 shown in FIG. 1. Since the pedal 40 and the rotating shaft 31 are fixed to each other and rotate integrally, the rotation angle of the rotating shaft 31 is the same as the rotation angle of the pedal 40.

The arm 32 is provided independently of the pedal 40, and is provided on a pedal back surface 40*b*, which is a surface of the pedal 40 opposite to the one that receives the pedaling force from the driver 81. The arm 32 connects the pedal 40 and the rotating shaft 31, and rotates the pedal 40 and the rotating shaft 31 integrally. The arm 32 has, integrally in one body, a back plate portion 321 fixed to the pedal back surface 40*b* of the pedal 40 and a side plate portion 322 substantially perpendicular to the back plate portion 321. The back plate portion 321 of the arm 32 is fixed to the pedal 40 by, for example, screwing.

The side plate portion 322 of the arm 32 is arranged on one side of the housing 10, and one end of the rotating shaft 31 is fixed to the side plate portion 322. Since the pedal 40 and the rotating shaft 31 are respectively fixed to the arm 32 in the above-described manner, the arm 32, the pedal 40, and the rotating shaft 31 rotate integrally about the pedal axis CL.

Also, the rotating shaft 31 is connected to the pedal 40 via the arm 32. Therefore, the pedal 40 is arranged apart from the housing 10 without contacting the housing 10 at any rotation angle within a movable range of the pedal 40.

The pedal 40 has a plate shape that is thick in a plate thickness direction Dt and extends in an extending direction Ds, and is made of, for example, a metal material or a resin material. The plate thickness direction Dt is a direction orthogonal to the extending direction Ds. The extending direction Ds is the longitudinal direction of the pedal 40.

The pedal 40 swings to one side in a circumferential direction about the pedal axis CL when the driver 81 pedals the pedal 40 from one side in the plate thickness direction Dt. Therefore, the one side of the pedal 40 in the plate thickness direction Dt is, in other words, an operation side of the pedal 40 which is a side susceptible to a pedaling operation by the driver 81. The other side opposite to the one side in the plate thickness direction Dt is, in other words, a non-operation side opposite to the operation side of the pedal 40.

Specifically, the housing 10 supports the pedal 40 via the rotating shaft 31 to be swingable about the pedal axis CL. Since the pedal 40 is fixed to the rotating shaft 31 via the arm 32, the pedal 40 and the rotating shaft 31 integrally swing about the pedal axis CL when the driver 81 pedals the pedal 40.

In the present embodiment, the axial direction of the pedal axis CL, the thickness direction Dt of the pedal 40, and the extending direction Ds of the pedal 40 is directions that cross each other, or strictly speaking, directions that are perpendicular to each other. Further, in the description of the present embodiment, the plate thickness direction Dt of the pedal 40 is also referred to as a pedal plate thickness direction Dt, and the extending direction Ds of the pedal 40 is also referred to as a pedal extending direction Ds.

The pedal 40 is arranged obliquely with respect to the travel direction Da of the vehicle in a non-pedaled state (in other words, in a released state) in which the driver 81 does not pedal the pedal 40. Specifically, the pedal 40 is obliquely arranged such that an upper end portion of the pedal 40 is positioned in front of and above in the vehicle with respect to a lower end portion of the pedal 40. That is, the plate shape of the pedal 40 is so extended in the non-pedaled state of the pedal 40, with one side in the pedal extending direction Ds positioned lower than the other side in the pedal extending direction Ds in the vehicle. Note that, in the present embodiment, even in a maximum pedaled state of the pedal 40, which will be described later, one side of the pedal 40 in the pedal extending direction Ds is positioned lower than the other side thereof in the pedal extending direction Ds.

The thickness of the pedal 40 is not constant, and the pedal 40 has a thick portion 411 and a thin portion 412 arranged on one side of the thick portion 411 in the pedal extending direction Ds. The thick portion 411 is thicker than the thin portion 412 in thickness. For example, the thick portion 411 is structured in which a plate-like separate component is laminated and fixed on one side in the plate thickness direction Dt of a plate-like portion extending from the thin portion 412 and having the same thickness as the thin portion 412. In the present embodiment, a surface of the pedal 40 that faces one side in the pedal plate thickness direction Dt and is formed in the thick portion 411 serves as a tread surface 40*a* that is a surface of the pedal 40 pedaled by the driver 81 when the driver 81 performs a pedaling operation.

Further, the pedal 40 has the pedal back surface 40*b* provided on the other side of the pedal 40 in the pedal plate thickness direction Dt. The pedal back surface 40*b* is an outer surface facing the other side in the pedal plate thickness direction Dt. The pedal back surface 40*b* is formed over an entire length of the pedal 40 in the pedal extending direction Ds.

In the present embodiment, one side of the pedal 40 in the pedal extending direction Ds is arranged on the rear side in the travel direction of the vehicle compared to the other side of the pedal 40 in the pedal extending direction Ds.

Here, referring to the positional relationship between the pedal 40 and the rotating shaft 31, etc., the rotating shaft 31 is arranged on the other side of the pedal plate thickness direction Dt from the pedal back surface 40*b*. Further, the housing 10 and the reaction force generation mechanism 60 are arranged on the other side of the pedal 40 in the pedal plate thickness direction Dt. The reaction force generation mechanism 60 is arranged on the front side of the rotating shaft 31 in the travel direction of the vehicle.

The pedal 40 swings about the pedal axis CL within a limited predetermined rotation angle range (in other words, movable range) of less than one rotation in response to the pedaling operation of the driver 81. Specifically, the rotation angle range of the swing of the pedal 40 is a range from a minimum rotation position to a maximum rotation position of the pedal 40. That is, when the pedal 40 is in a non-pedaled state, the rotation angle of the pedal 40 is at the minimum rotation position, and when the pedal 40 is in a maximum pedaled state, which is a state of being fully pedaled by the driver 81, the rotation angle of the pedal 40 is at the maximum rotation position.

Note that FIGS. 2 and 3, and also FIGS. 4 and 5, which will be described later, respectively show the pedal device 1 in a non-pedaled state of the pedal 40, that is, in a state in which the driver 81 is not applying the pedaling force to the pedal 40.

For example, within the rotation angle range described above, the pedal 40 swings in a manner in which the upper end portion of the pedal 40 moves toward the front side and the lower side of the vehicle as the pedaling force of the driver 81 applied to the pedal 40 from one side in the pedal plate thickness direction Dt increases. In short, the more the pedaling force of the driver 81 increases, the more the pedal 40 swings to one side in the circumferential direction about the swing center CL. Conversely, as the pedaling force of the driver 81 applied to the pedal 40 from one side in the pedal plate thickness direction Dt decreases, the pedal 40 swings in a manner in which the upper end portion of the pedal 40 moves toward the rear side and the upper side of the vehicle due to the effects of the reaction force generation mechanism 60. In short, the pedal 40 swings to the other side in the circumferential direction about the swing center CL as the pedaling force of the driver 81 decreases.

In the present embodiment, the minimum rotation position of the pedal 40 is defined by a release stopper 781. The maximum rotation position of the pedal 40 is defined by a pedal stopper 782.

The release stopper 781 of the present embodiment is arranged outside the housing 10. The release stopper 781 includes a shaft 781a and a ring 781b, as shown in FIG. 5. The shaft 781a is a shaft as a metal component that is fixed to the side plate portion 322 of the arm 32 and formed in a rod shape from a metal material. That is, the release stopper 781 includes a shaft 781a as a metal component. The shaft 781a protrudes from the side plate portion 322 toward the housing 10 along the axial direction of the pedal axis CL.

The ring 781b is provided with a through hole 783 penetrating therethrough along the axial direction of an axis BL of the shaft 781a. The ring 781b is formed in a ring shape that covers the shaft 781a from an outer periphery side by centering on the axis BL. That is, the ring 781b is arranged on the outer peripheral side of the shaft 781a about the axis BL.

In the present embodiment, the ring 781b is fixed to the shaft 781a by press-fitting the shaft 781a into the through hole 783 of the ring 781b. Before the shaft 781a is inserted into the through hole 783 of the ring 781b, the diameter of the through hole 783 of the ring 781b is smaller than the diameter of the shaft 781a. Therefore, in a state in which the shaft 781a is inserted into the through hole 783 of the ring 781b, the ring 781b is elastically deformed to apply elastic force to the shaft 781a. That is, the ring 781b is fixed to the shaft 781a in a state in which the shaft 781a is press-fitted into the through hole 783 of the ring 781b.

The ring 781b is made of a resin material. The ring 781b is a cushioning member that cushions an impact generated between the release stopper 781 and an inner wall 10d of a stopper groove 10c on the housing 10 when the release stopper 781 hits the inner wall 10d (that is, a stopper) of the stopper groove 10c on the housing 10.

Here, the stopper groove 10c is formed in the housing 10 to be recessed toward the housing space. The stopper groove 10c is formed to extend in an arc shape about the pedal axis CL. The inner wall 10d of the stopper groove 10c provides a contact portion with which the ring 781b of the release stopper 781 contacts when the pedal 40 is stopped at the minimum rotation position.

The release stopper 781 is formed on a side surface of the housing 10 and is inserted into the stopper groove 10c, and moves inside the stopper groove 10c as the pedal 40 swings. That is, the release stopper 781 is arranged outside the housing 10. Therefore, the inside of the stopper groove 10c and the release stopper 781 are isolated from the reaction force generation mechanism 60 by the housing 10.

When the pedal 40 is in the non-pedaled state, the release stopper 781 abuts against the inner wall 10d of the stopper groove 10c in the circumferential direction about the pedal axis CL, thereby stopping the pedal 40 at the minimum rotation position. The release stopper 781 is arranged on the front side of the rotating shaft 31 in the travel direction of the vehicle.

The pedal stopper 782 is provided in a portion of the housing 10 positioned on the front side of the vehicle with respect to the pedal axis CL. Specifically, the pedal stopper 782 is provided at an upper end of a wall surface of the housing 10 positioned on the front side of the vehicle. When the pedal 40 is in the maximum pedaled state, the pedal stopper 782 contacts an upper end of the pedal back surface 40b or its proximity, and holds the pedal 40 at the maximum rotation position.

The reaction force generation mechanism 60 generates a reaction force against the pedaling force applied to the pedal 40 by the driver 81. The reaction force generation mechanism 60 is configured by a plurality of springs, mechanical parts, or the like, and is a reaction force generation portion that applies elastic force (that is, reaction force) based on elastic deformation of the plurality of springs to the pedal 40 via the rod 76. Specifically, the reaction force generation mechanism 60 applies elastic force to the pedal 40 toward the other side in the circumferential direction about the pedal axis CL.

Since the reaction force generation mechanism 60 is accommodated in the housing 10, it is arranged on the non-operation side with respect to the pedal 40. The reaction force generation mechanism 60 is supported within the housing 10 by the base plate 10B.

Figure 2:
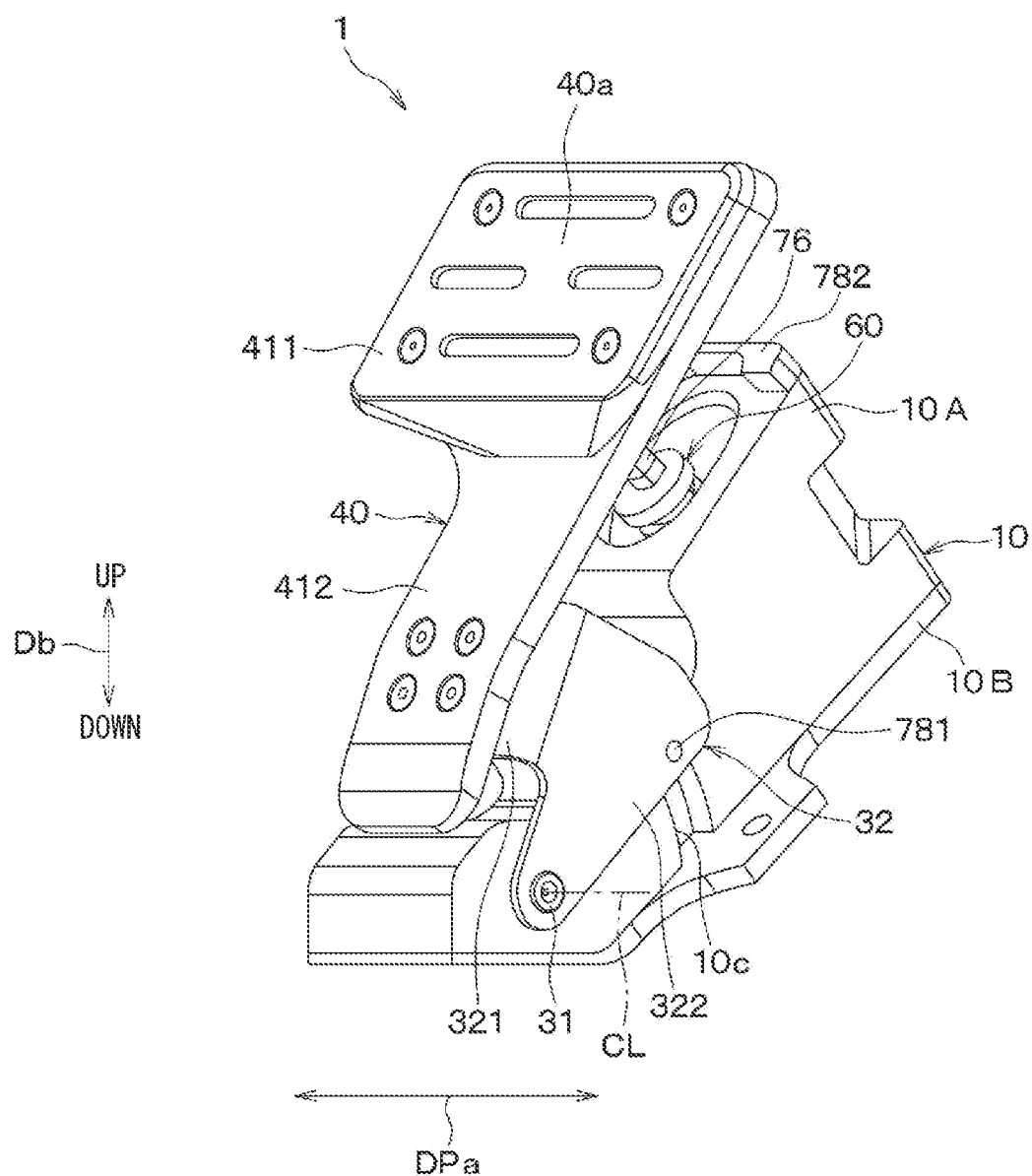
FIG. 2 is a perspective view showing an appearance of the pedal device of FIG. 1 according to the first embodiment.
Figure 3:
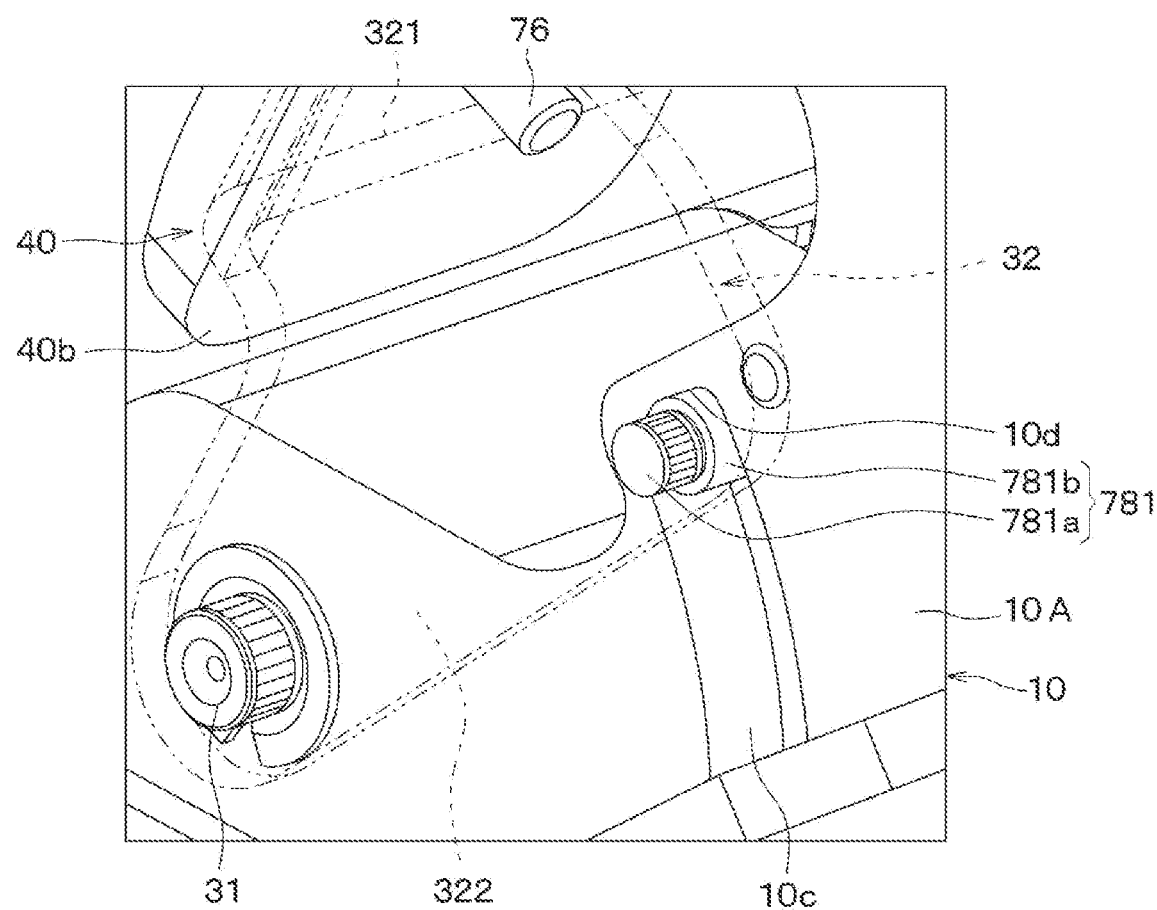
FIG. 3 is a perspective, partially enlarged view of the pedal device of FIG. 1 according to the first embodiment, showing a releasing stopper portion and a stopper groove of a housing with an arm transparently shown, in a state in which the pedal is not stepped on by a driver and the pedal is stopped.
Figure 4:
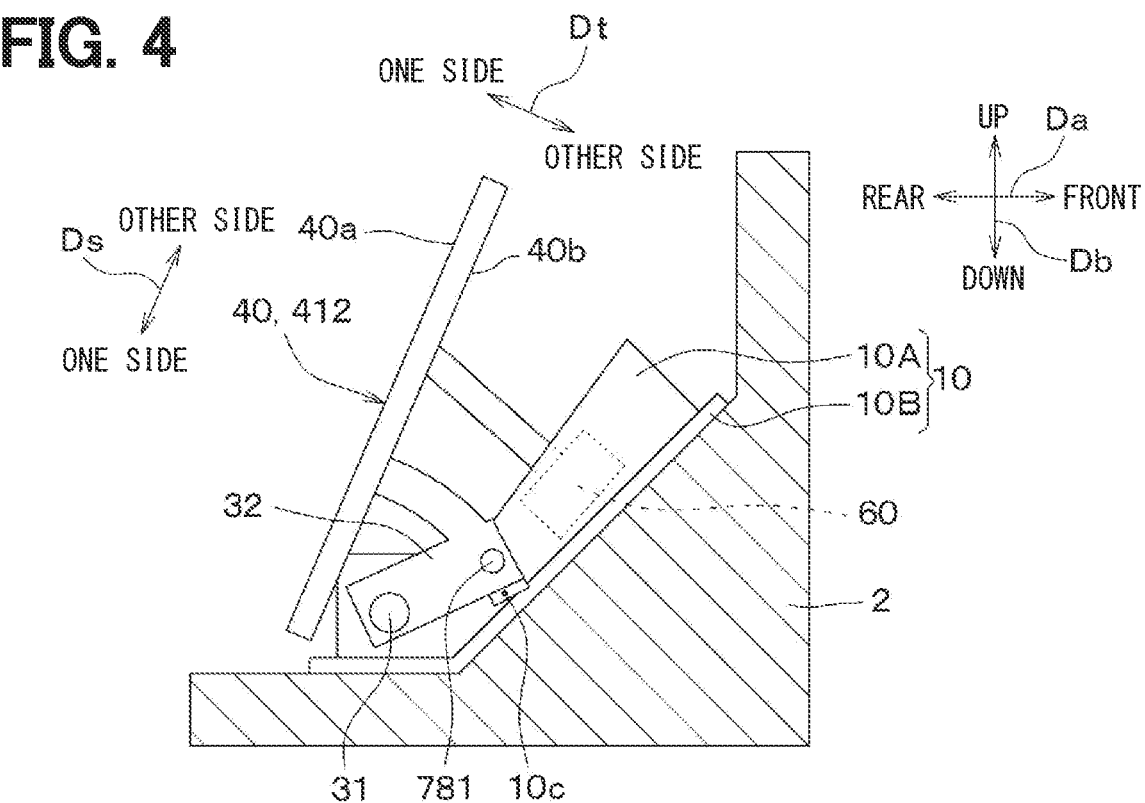
FIG. 4 is a schematic diagram of the pedal device of FIG. 1 according to the first embodiment as seen from a width direction of a vehicle, supplementally explaining a reaction force generation mechanism disposed in the housing of the pedal device.
Figure 5:
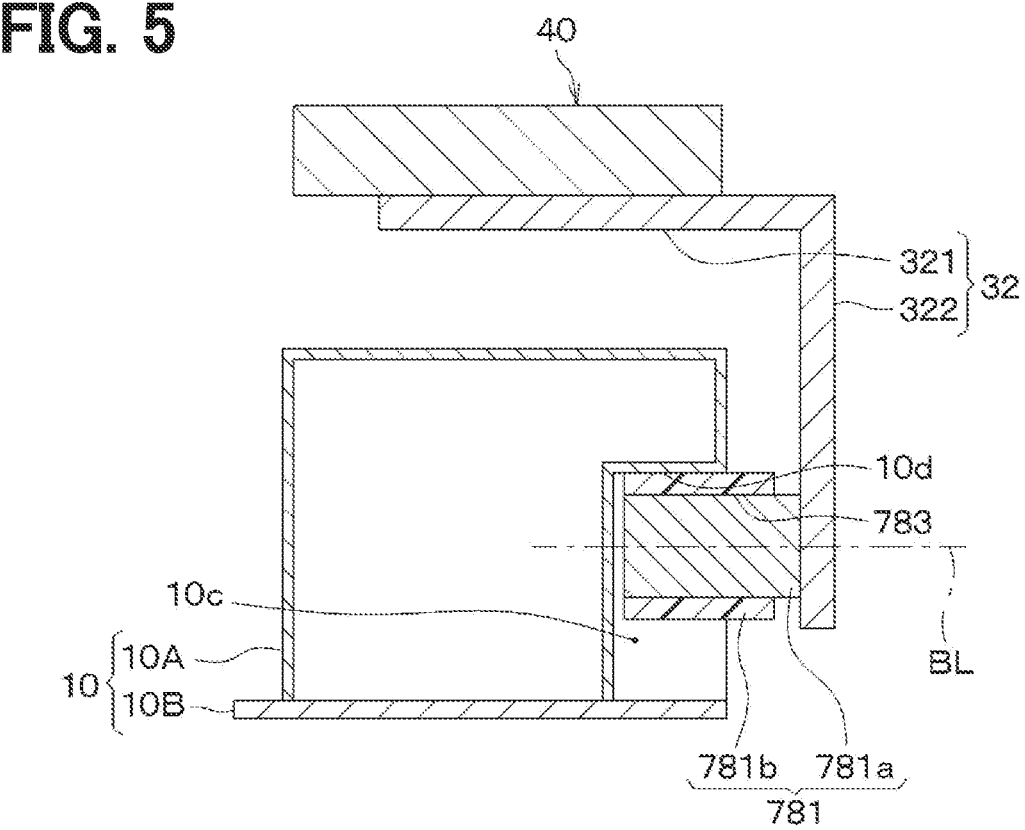
FIG. 5 is a cross-sectional view of the pedal device of FIG. 1, with the stopper groove cut along a plane formed along a circumferential direction centering on a pedal axis, in a state in which the pedal is not stepped on by the driver and the releasing stopper is in contact with an inner wall of the stopper groove of the housing.

As shown in FIGS. 2, 3 and 4, the rod 76 is provided at a position between the pedal 40 and the reaction force generation mechanism 60. The rod 76 is pushed by the pedal 40 via the rod 76 as the pedaling force of the driver 81 is applied to the pedal 40.

Specifically, the rod 76 is provided to protrude from the pedal 40 on the non-operation side of the pedal 40. For example, the rod 76 is formed to protrude in a rod shape from the pedal back surface 40b. A tip portion of the rod 76 provided on the non-operation side is in contact with the reaction force generation mechanism 60.

The rod 76 is connected to the pedal 40 so that the direction of the rod 76 protruding from the pedal 40 is fixed. Fixing the direction of the rod 76 protruding from the pedal 40 means, in other words, that the axial center/axial direction/direction of axis of the rod 76 is fixed and does not change.

The rod 76 connected to the pedal 40 in the above-described manner presses the reaction force generation mechanism 60 as the driver 81 pedals the pedal 40. On the other hand, the rod 76 applies the elastic force generated by the reaction force generation mechanism 60 to the pedal 40 toward the other side in the circumferential direction about the pedal axis CL.

Next, the operation of the pedal device 1 of the present embodiment will be described with reference to FIGS. 1 to 5.

First, when the pedaling force of the driver 81 is applied to the pedal 40, the pedal 40, the rotating shaft 31 and the arm 32 swing about the pedal axis CL. Specifically, the pedal 40, the rotating shaft 31, and the arm 32 swing about the pedal axis CL such that a portion of the pedal 40 in the upper part of the vehicle with respect to the pedal axis CL moves toward the floor 2 or toward the dash panel. In other words, the pedal 40 swings to change its posture from the non-pedaled state to the maximum pedaled state.

At this time, the rotation angle sensor 90 outputs an electrical signal indicating the rotation angle of the rotating shaft 31 to the electronic control device 83. The electronic control device 83 decelerates or stops the automobile 80, by performing drive control of the brake circuit included in the brake-by-wire system 82 to generate hydraulic pressure (for example, oil pressure) required for braking the vehicle 80, and by driving the brake pads with the hydraulic pressure.

Further, when the pedal 40 swings to change its posture from the non- pedaled state to the maximum pedaled state, the more the pedal 40 approaches the maximum pedaled state from the non-pedaled state, the more the springs constituting the reaction force generation mechanism 60 elastically deform. Therefore, as the pedal 40 approaches the maximum pedaled state from the non-pedaled state, the elastic force applied from the reaction force generation mechanism 60 to the pedal 40 via the rod 76 to the other side in the circumferential direction increases.

At this time, as the pedal 40 swings, the release stopper 781 moves in the stopper groove 10c to one side in the circumferential direction about the pedal axis CL.

Further, when the pedal 40 swings and abuts against the pedal stopper 782, the pedal 40 is in the maximum pedaled state. Thereafter, when the pedal 40 is released from the foot of the driver 81 and the application of the pedaling force of the driver 81 to the pedal 40 is stopped, the plurality of springs in the reaction force generation mechanism 60 return from an elastically-deformed state.

At this time, while being in a state in which the elastic force of the spring in the reaction force generation mechanism 60 is applied to the pedal 40 via the rod 76, the pedal 40 departs from the pedal stopper 782, and the pedal 40, the rotating shaft 31 and the arm 32 swing to the other side in the circumferential direction about the pedal axis CL.

Specifically, the pedal 40, the rotating shaft 31, and the arm 32 swing about the pedal axis CL so that a portion of the pedal 40 in the upper part of the vehicle with respect to the pedal axis CL moves toward the opposite side of the floor 2 or toward the opposite side of the dash panel. In other words, the pedal 40 swings to change its posture from the maximum pedaled state to the non-pedaled state.

At this time, the release stopper 781 moves in the stopper groove 10c to the other side in the circumferential direction about the pedal axis CL. Thereafter, when the release stopper 781 abuts against the inner wall 10d of the stopper groove 10c, the pedal 40 stops in the non-pedaled state.

According to the present embodiment described above, the pedal device 1 is an organ-type pedal device in which a portion of the pedal 40 that is pedaled by the driver 81 is arranged in the upper part of the vehicle with respect to the swing center CL of the pedal 40. The pedal device 1 includes the pedal 40 formed in a plate shape having a thickness in the plate thickness direction Dt and extending in the extending direction Ds, and supported by the housing 10 to be swingable in a circumferential direction about the pedal axis CL. The pedal 40 swings to one side in the circumferential direction centering on the pedal axis CL by being pedaled by the user from one side in the plate thickness direction Dt.

The pedal device 1 includes the housing 10 and the reaction force generation mechanism 60 arranged in the housing 10 and applying elastic force to the pedal 40 on the other side in the circumferential direction about the pedal axis CL. The pedal device 1 includes the release stopper 781 arranged outside the housing 10, supported by the pedal 40, and swinging about the pedal axis CL together with the pedal 40.

The release stopper 781 contacts the inner wall 10d of the stopper groove 10c on the housing 10 when the pedal 40 is not pedaled by the driver 81, thereby stopping the pedal 40 at the minimum rotation position.

According to the above, the release stopper 781 is isolated from the reaction force generation mechanism 60 by the housing 10.

Therefore, even if the release stopper 781 repeatedly contacts the inner wall 10d of the housing 10 to cause wear of the release stopper 781 or the inner wall 10d, generating abrasion powder, the abrasion powder is isolated from the reaction force generation mechanism 60 by the housing 10.

Therefore, it is possible to suppress the abrasion powder from adversely affecting the reaction force generation mechanism 60 in the housing 10. Therefore, it is possible to provide the pedal device 1 that suppresses the adverse effect of the abrasion powder on the reaction force generation mechanism 60.

The pedal device 1 of the present embodiment described above has the following effects (1) to (7).

(1) The pedal device 1 includes the arm 32 that is provided independently of the pedal 40 and swings about the pedal axis CL together with the pedal 40 when the pedal 40 is pedaled by the driver 81. The release stopper 781 is provided on the arm 32.

In the present embodiment, when the pedal 40 is released from the foot of the driver 81, the pedal 40 swings due to the elastic force from the reaction force generation mechanism 60.

Therefore, by adjusting the length of the arm 32 or adjusting the mounting position of the arm 32 with respect to the pedal 40, the release stopper 781 can be moved away from the rotating shaft 31. Therefore, it is possible to reduce the impact force generated between the release stopper 781 and the inner wall 10d when the release stopper 781 contacts the inner wall 10d.

(2) In the pedal device 1, the release stopper 781 can be moved away from the rotating shaft 31 by adjusting the length of the arm 32 or adjusting the mounting position of the arm 32 with respect to the pedal 40. Therefore, it is possible to reduce variations in an initial angle of the pedal 40 caused by tolerance variations in the release stopper 781.

(3) The pedal device 1 includes the rotating shaft 31 extending in an axial direction DPa of the pedal axis CL, which is centered on the pedal axis CL, and is supported by the housing 10 to be swingable in the circumferential direction about the pedal axis CL.

One side of the pedal 40 in the extending direction Ds is arranged on the rear side of the travel direction of the vehicle with respect to the other side of the pedal 40 in the extending direction Ds. The reaction force generation mechanism 60 is arranged on the front side of the rotating shaft 31 in the travel direction of the vehicle. The release stopper 781 is arranged on the front side of the rotating shaft 31 in the travel direction of the vehicle.

Therefore, compared to the case where the release stopper 781 is arranged on the rear side of the rotating shaft 31 in the travel direction of the vehicle, the size of the pedal device 1 is reducible. Therefore, the release stopper 781 can be kept away from the rotating shaft 31 without increasing the size / volume of the pedal device 1. Thereby, corresponding effects as the above item (1) are achievable.

(4) In the present embodiment, the rotating shaft 31 is connected to the arm 32. Therefore, positioning of the release stopper 781 and positioning of the rotating shaft 31 are performable by using one arm 32.

Therefore, the number of components of the pedal device 1 is reducible as compared with the case where two arms are provided to support the release stopper 781 and the rotating shaft 31 with respect to the pedal 40.

(5) The ring 781b is made of a resin material. Therefore, as a cushioning member, it is possible to appropriately cushion the impact generated at a position between the release stopper 781 and the inner wall 10d. Accordingly, it is possible to reduce an impact noise generated when the release stopper 781 hits the inner wall 10d.

(6) The release stopper 781 includes the shaft 781a made of metal. Therefore, the release stopper 781 can withstand a high impact force generated between the release stopper 781 and the inner wall 10d when the pedal 40 is stopped by the release stopper 781 coming into contact with the inner wall 10d.

(7) The release stopper 781 includes the shaft 781a and the ring 781b formed in a ring shape and arranged on the outer peripheral side of the shaft 781a about the axis BL.

Therefore, the material of the ring 781b of the release stopper 781 that contacts the inner wall 10d of the housing 10 can be made different from the material of the shaft 781a. Accordingly, as the resin material of the ring 781b, a suitable material for properly absorbing the impact generated between the release stopper 781 and the inner wall 10d.

Second Embodiment

In the first embodiment described above, an example in which the release stopper 781 and the rotating shaft 31 are connected by the single arm 32 has been described. However, in the present second embodiment, an example in which a release stopper 781 and a rotating shaft 31 are connected to separate arms 32A and 32B will be described with reference to FIG. 6.

Figure 6:
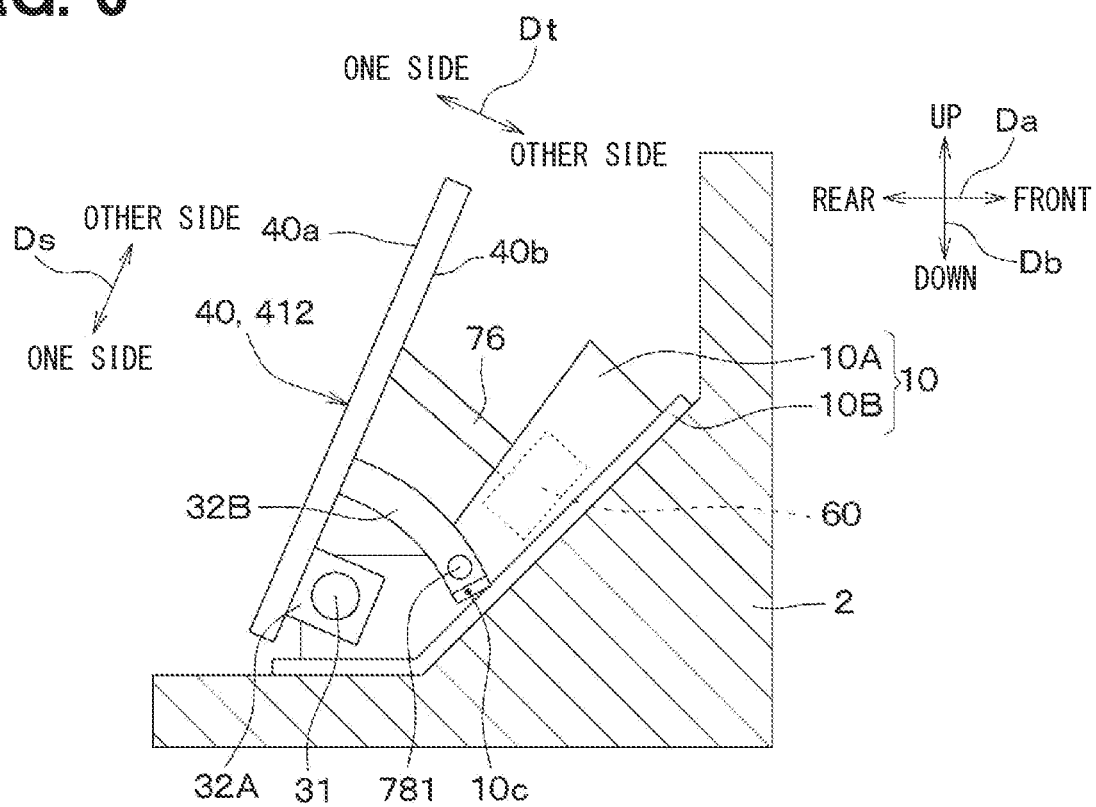
FIG. 6 is a schematic diagram of a pedal device according to a second embodiment as seen from a width direction of a vehicle, showing a state in which an arm and a releasing stopper are arranged on a rear side of the vehicle in a travel direction of the vehicle with respect to a reaction force generation mechanism.

In FIG. 6, the same reference numerals as those in FIGS. 1 to 5 denote the same or corresponding components, and description thereof will be omitted. The present embodiment and the first embodiment have the same or corresponding configuration except for the arms 32A and 32B, and the arms 32A and 32B will be mainly described in the following.

The arm 32A is provided on a pedal back surface 40b of a pedal 40. The arm 32A connects the pedal 40 and a rotating shaft 31. The arm 32B is provided on the pedal back surface 40b of the pedal 40. The arm 32B connects the pedal 40 and a release stopper 781.

In the present embodiment, the arm 32B and the release stopper 781 are arranged on a rear side of a reaction force generation mechanism 60 in the travel direction of a vehicle. The arm 32B and the release stopper 781 are arranged on a front side of the arm 32A and the rotating shaft 31 in the travel direction of the vehicle.

Third Embodiment

In the second embodiment described above, an example in which the arm 32B and the release stopper 781 are arranged on the rear side of the reaction force generation mechanism 60 in the travel direction of the vehicle has been described. However, instead of the above, in the third embodiment, an example in which an arm 32B and a release stopper 781 are arranged on a front side of a reaction force generation mechanism 60 in the travel direction of the vehicle will be described with reference to FIG. 7.

Figure 7:
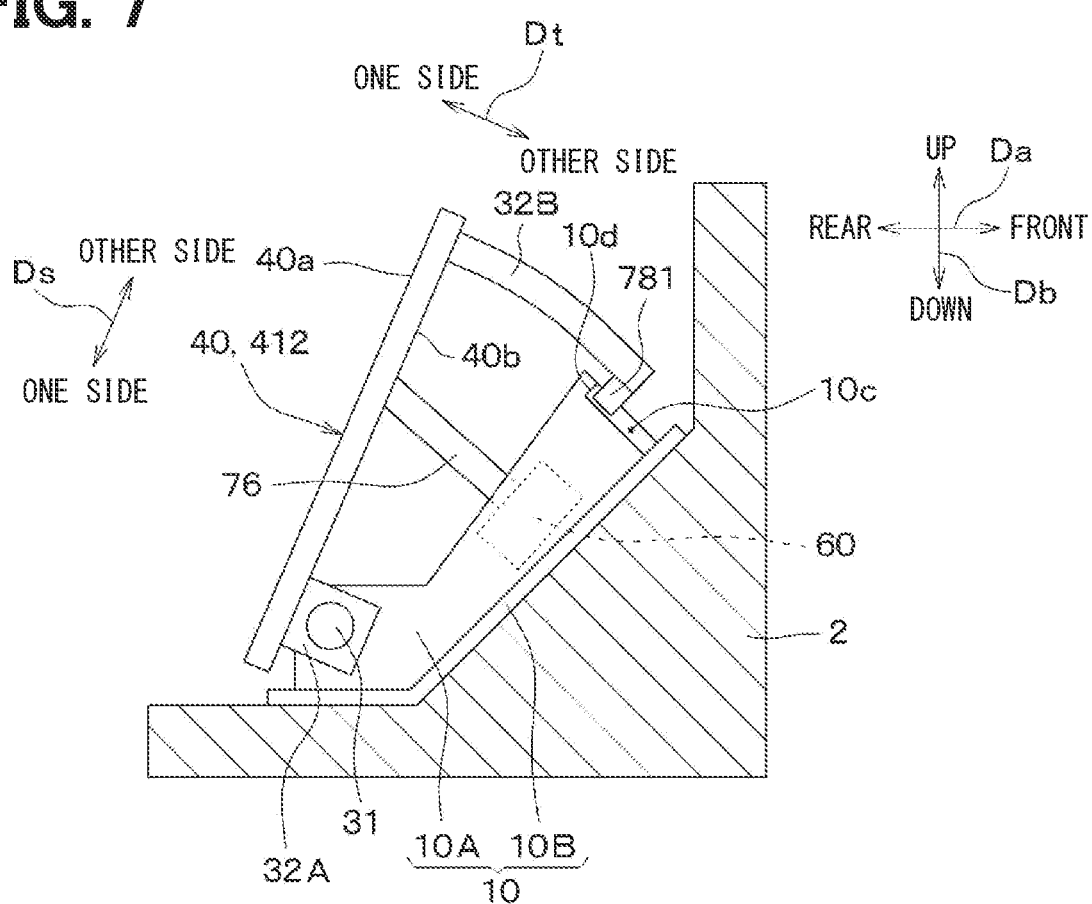
FIG. 7 is a schematic diagram of a pedal device according to a third embodiment as seen from a width direction of a vehicle, showing a state in which an arm and a releasing stopper are arranged on a front side in a travel direction of the vehicle with respect to a reaction force generation mechanism.

In FIG. 7, the same reference numerals as those in FIG. 6 denote the same components, and the description thereof will be omitted. The present embodiment and the second embodiment have a corresponding configuration except for the arrangement of the arms 32A and 32B. The arm 32B and the release stopper 781 are arranged on the front side of the arm 32A and the rotating shaft 31 in the travel direction of the vehicle.

Fourth Embodiment

In the fourth embodiment, a specific example of a method of fixing the arm 32 and the release stopper 781 in the first embodiment will be described with reference to FIG. 8.

In the present embodiment, a shaft 781a is engaged with a through hole 32a of an arm 32 by press-fitting the shaft 781a of a release stopper 781 into the through hole 32a.

Specifically, before the shaft 781a is inserted into the through hole 32a, the diameter of the shaft 781a is larger than the diameter of the through hole 32a. Therefore, by inserting the shaft 781a into the through hole 32a, the shaft 781a is compressed by elastic deformation by a hole forming portion of the arm 32 that forms the through hole 32a. Therefore, the shaft 781a in an inserted state into the through hole 32a applies elastic force to the hole forming portion of the arm 32 that forms the through hole 32a.

Thus, in the present embodiment, the shaft 781a of the release stopper 781 is press-fitted into the through hole 32a of the arm 32, thereby fixing the shaft 781a to the arm 32.

In the above-described fourth embodiment, an example has been described in which the shaft 781a is elastically compressed by the hole forming portion of the arm 32 that forms the through hole 32a by having the shaft 781a inserted into the through hole 32a.

However, instead of the above, by inserting the shaft 781a into the through hole 32a, the hole forming portion forming the through hole 32a of the arm 32 may be elastically deformed by the shaft 781a.

In such case, the hole forming portion forming the through hole 32a of the arm 32 applies elastic force to the shaft 781a, in a state in which the shaft 781a is inserted into the through hole 32a.

Fifth Embodiment

In the above-described fourth embodiment, an example in which the release stopper 781 is fixed to the arm 32 by press-fitting the shaft 781a of the release stopper 781 into the through hole 32a of the arm 32 has been described.

However, instead of the above, in the fifth embodiment, an example in which a shaft 781a of a release stopper 781 is fastened to an arm 32 with a bolt 33 will be described with reference to FIG. 9.

Figure 8:
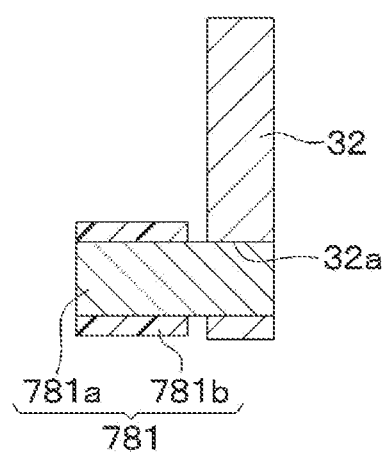
FIG. 8 is a cross-sectional view showing a configuration in which a shaft of a releasing stopper is press-fitted to an arm in a pedal device according to a fourth embodiment.
Figure 9:
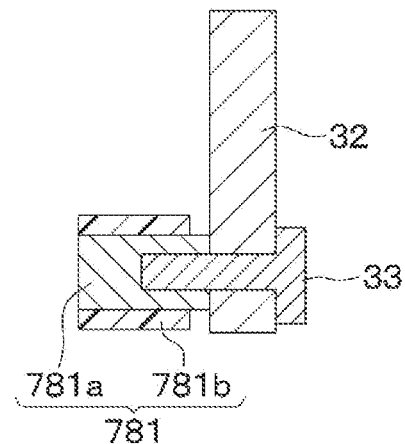
FIG. 9 is a cross-sectional view showing a configuration in which a shaft of a releasing stopper is fixed to an arm by a bolt in a pedal device according to a fifth embodiment.

In FIG. 9, the same reference numerals as those in FIG. 8 denote the same components, and the description thereof is omitted.

In the present embodiment, the bolt 33 fastens the arm 32 and the shaft 781a of the release stopper 781. As a result, the release stopper 781 is fixed to the arm 32.

The present embodiment and the above-described fourth embodiment differ only in the fixing structure between the arm 32 and the release stopper 781, with the other configurations remaining as is.

Sixth Embodiment

In the fifth embodiment described above, an example in which the shaft 781a of the release stopper 781 is fastened to the arm 32 by the bolt 33 has been described. However, in the sixth embodiment, an example in which a shaft 781*a* of a release stopper 781 and an arm 32 are fixed by caulking the shaft 781*a* of the release stopper 781 will be described.

Figure 10:
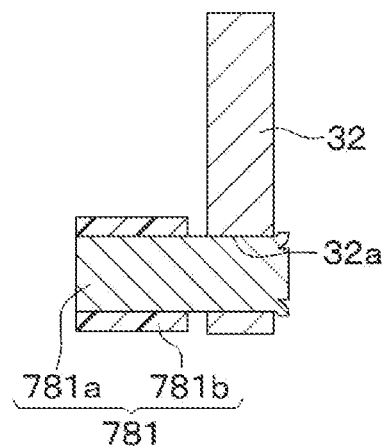
FIG. 10 is a cross-sectional view showing a configuration in which the shaft of the releasing stopper is fixed to an arm by caulking in a pedal device according to a sixth embodiment.

In the present embodiment, as shown in FIG. 10, the shaft 781*a* of the release stopper 781 is caulked while being inserted into a through hole 32*a* of the arm 32. As a result, the shaft 781*a* of the release stopper 781 and the arm 32 are fixed.

Seventh Embodiment

In the above-described first to sixth embodiments, examples in which the shaft 781*a* and the arm 32 are independent components have been described. However, instead of the above, in the present seventh embodiment, an example, in which a shaft 781*a* and an arm 32 are integrally molded to form an integrally-molded one-piece object, will be described with reference to FIGS. 11 and 12.

Figure 11:
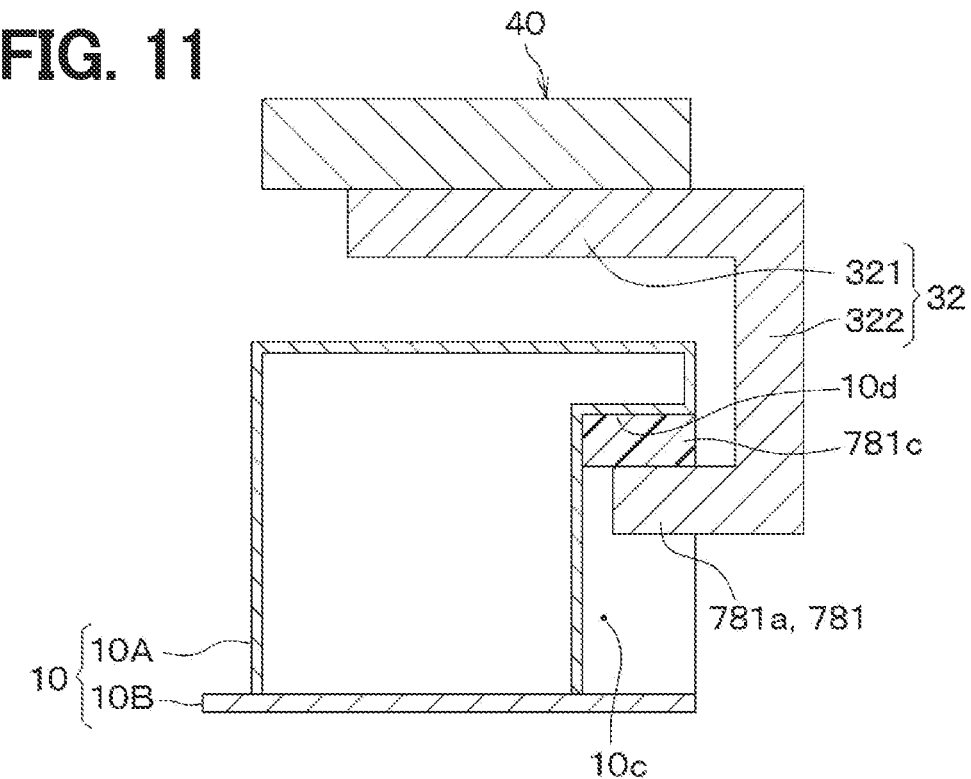
FIG. 11 is a cross-sectional view corresponding to FIG. 5, supplementally explaining that an arm and a releasing stopper constitute an integrally-molded one-piece object in a pedal device according to a seventh embodiment.
Figure 12:
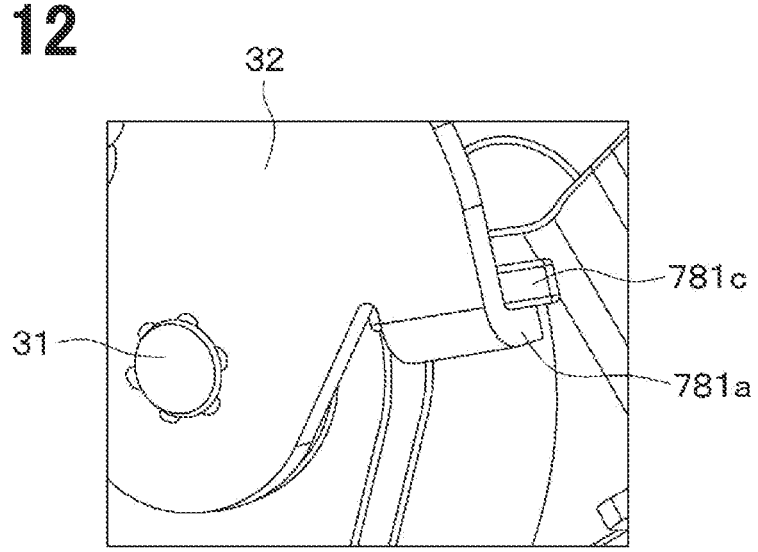
FIG. 12 is a perspective view of the arm and the releasing stopper in the pedal device according to the seventh embodiment, seen from a width direction of a vehicle.

FIG. 11 is a partial cross-sectional view showing a configuration of the shaft 781*a* and the arm 32 of a pedal device 1 in the present embodiment, and FIG. 12 shows a perspective view of the configuration of the shaft 781*a* and the arm 32 of the pedal device 1 in the present embodiment.

In the present embodiment, as described above, the shaft 781*a* and the arm 32 constitute an integrally-molded one-piece object. A ring 781*b* is not used for a release stopper 781, and the shaft 781*a* constitutes the release stopper 781. The shaft 781*a* and the arm 32 are made of metal material.

A cushioning member 781*c* is fixed to an inner wall 10*d* of a stopper groove 10*c* on a housing 10 to cushion the impact generated when the release stopper 781 hits the inner wall 10*d*. The cushioning member 781*c* is made of a resin material.

According to the present embodiment described above, in the pedal device 1, the shaft 781*a* and the arm 32 constitute an integrally-molded one-piece object, as described above. Therefore, the number of components is reducible as compared with the case where the shaft 781*a* and the arm 32 are independent components.

In the present embodiment, the cushioning member 781*c* is fixed to the inner wall 10*d* of the stopper groove 10*c* on the housing 10. Therefore, when the release stopper 781 hits the inner wall 10*d*, the impact generated between the release stopper 781 and the inner wall 10*d* is reducible. Accordingly, it is possible to reduce an impact noise generated when the release stopper 781 hits the inner wall 10*d*.

Eighth Embodiment

In the first to seventh embodiments, an example in which the pedal 40 is held at the maximum rotation position by the pedal stopper 782 of the housing 10 has been described. However, instead of the above, in the eighth embodiment, an example in which a pedal 40 is held at the maximum rotation position by an inner wall 10*e* of a stopper groove 10*c* on a housing 10 will be described with reference to FIGS. 13, 14, 15 and 16.

Figure 13:
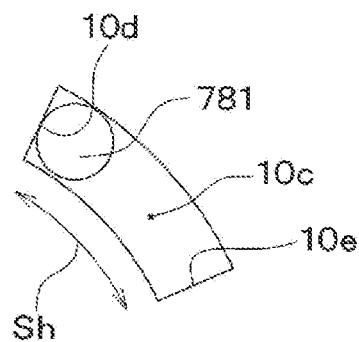
FIG. 13 is a schematic diagram showing a stopper groove and a releasing stopper of a housing when a pedal is not stepped on by a driver in a pedal device according to an eighth embodiment.
Figure 14:
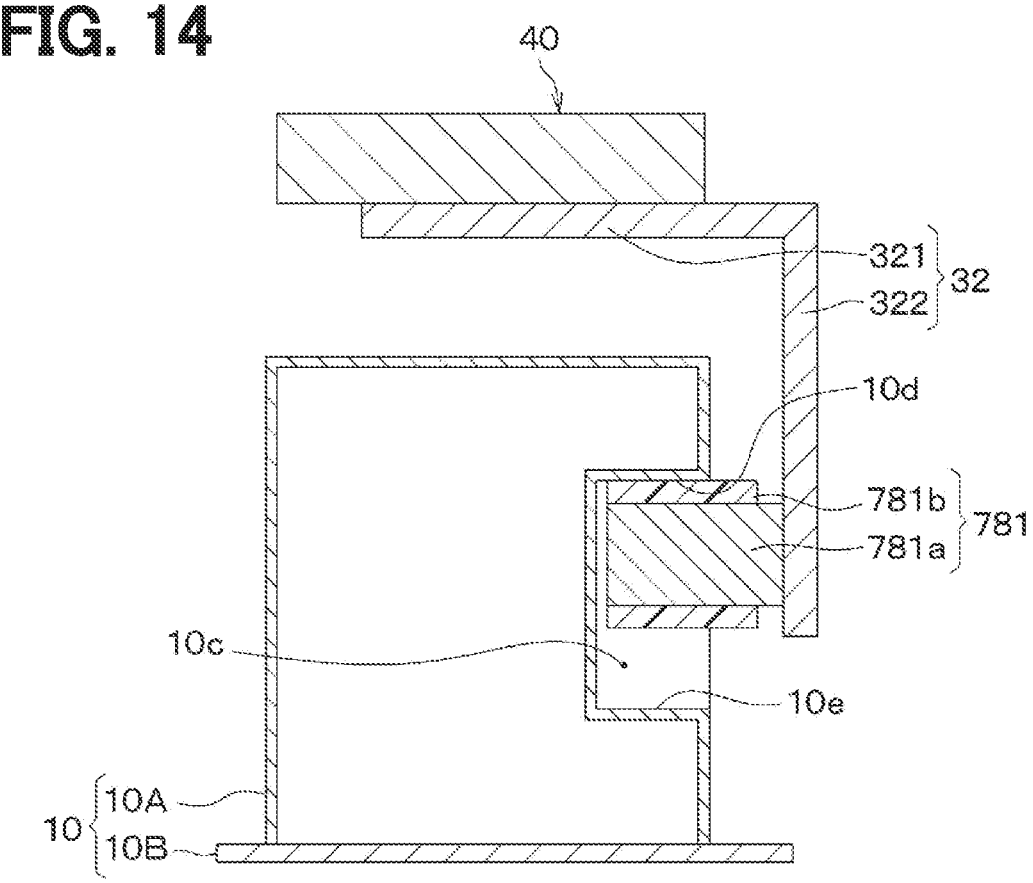
FIG. 14 is a cross-sectional view showing a state in which the pedal in the pedal device is stopped by the releasing stopper contacting an inner wall of the stopper groove of the housing when the pedal is not stepped on by the driver according to the eighth embodiment, and corresponding to FIG. 5.
Figure 15:
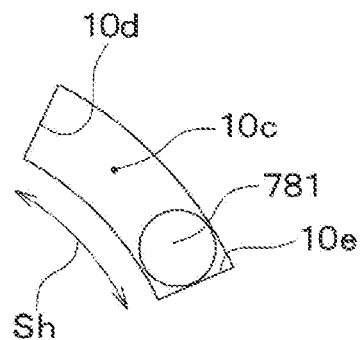
FIG. 15 is a schematic diagram showing a state in which the pedal in the pedal device is stopped by the releasing stopper contacting the inner wall of the stopper groove of the housing when the pedal is fully stepped on by the driver according to the eighth embodiment.
Figure 16:
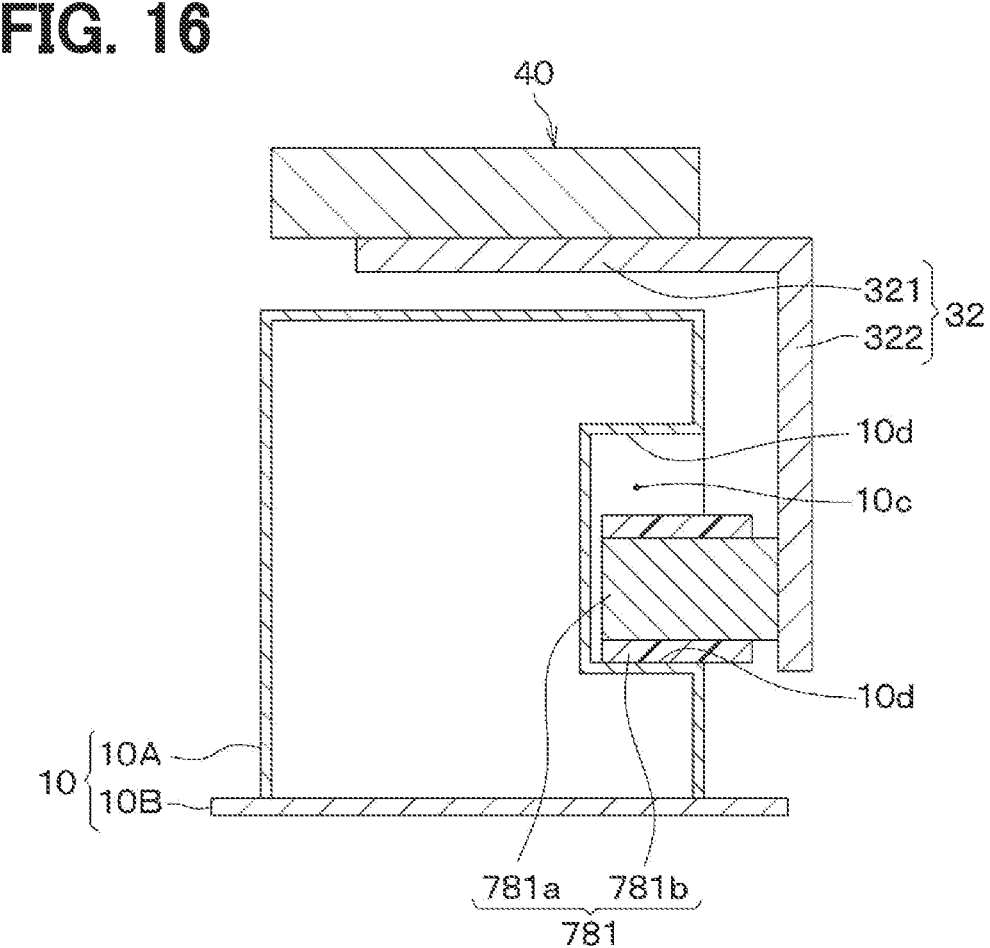
FIG. 16 is a cross-sectional view showing a state in which the pedal in the pedal device is stopped by the releasing stopper contacting the inner wall of the stopper groove of the housing when the pedal is fully stepped on by the driver according to the eighth embodiment, and corresponding to FIG. 5.

FIGS. 13 and 15 are diagrams schematically showing the stopper groove 10*c* on the housing 10 and a release stopper 781 when the release stopper 781 is in contact with an inner wall 10*d*. FIGS. 14 and 16 are cross-sectional views showing the stopper groove 10*c* on the housing 10 and the release stopper 781 when the release stopper 781 is in contact with the inner wall 10*e*.

In a pedal device 1 of the present embodiment, the inner wall 10*e* is provided on one side of the stopper groove 10*c* on the housing 10 in the circumferential direction about a swing center CL. The inner wall 10*e* is provided replacing the pedal stopper 782, and has a role to hold a pedal 40 at the maximum rotation position.

The inner wall 10*d* is provided on the other side of the stopper groove 10*c* on the housing 10 in the circumferential direction about the swing center CL, as in the first embodiment. The inner wall 10*d* has a role to hold the pedal 40 at the minimum rotation position as in the first embodiment.

Next, the operation of the pedal device 1 of the present embodiment will be described with reference to FIGS. 13 to 16.

First, when the pedal 40 is released from the foot of a driver 81, the application of the pedaling force of the driver 81 to the pedal 40 stops. Then, in a state in which the elastic forces of the plurality of springs in a reaction force generation mechanism 60 are applied to the pedal 40 via a rod 76 on the other side in a circumferential direction Sh, as shown in FIGS. 13 and 14, the stopper 781 abuts against the inner wall 10*d* of the stopper groove 10*c*. Therefore, the pedal 40 is stopped at the minimum rotation position.

Thereafter, when the pedaling force of the driver 81 is applied to the pedal 40, the pedal 40, a rotating shaft 31 and an arm 32 swing about the pedal axis CL. At this time, as the pedal 40 swings, the release stopper 781 moves in the stopper groove 10*c* toward one side in the circumferential direction about the pedal axis CL.

When the pedal 40 further swings, as shown in FIGS. 15 and 16, the release stopper 781 abuts against the inner wall 10*e* of the stopper groove 10*c*, and the pedal 40 stops in the maximum pedaled state. That is, when the driver 81 fully pedals the pedal 40, the release stopper 781 comes into contact with the inner wall 10*e* thereby stopping the pedal 40.

Next, when the pedaling force of the driver 81 is applied to the pedal 40, the pedal 40, the rotating shaft 31 and the arm 32 swing about the pedal axis CL. At this time, as the pedal 40 swings, the release stopper 781 moves in the stopper groove 10*c* toward one side in the circumferential direction Sh about the pedal axis CL.

According to the present embodiment described above, in the pedal device 1, the inner wall 10*e* is provided on one side of the stopper groove 10*c* on the housing 10 in the circumferential direction Sh about the swing center CL. When the pedal 40 is fully pedaled by the driver 81, the release stopper 781 contacts the inner wall 10*e* of the stopper groove 10*c* on the housing 10, thereby the pedal 40 is stoppable at the maximum rotation position, which is different from the minimum rotation position.

Therefore, the inner wall 10*e* of the stopper groove 10*c* on the housing 10 can be used instead of using the pedal stopper 782 to stop the pedal 40 at the maximum rotation position. Therefore, the pedal stopper 782 is removable from the housing 10. As a result, the number of components of the pedal device 1 is reducible compared to the case where the pedal stopper 782 is used.

Ninth Embodiment

In the first to eighth embodiments, an example in which the stopper groove 10*c* is provided on the housing 10, and the release stopper 781 is provided on the arm 32 is described.

However, instead of the above, in the ninth embodiment, an example in which a stopper groove 10*c* is provided on an arm 32 and a release stopper 781 is provided on a housing 10 will be described with reference to FIG. 17.

Figure 17:
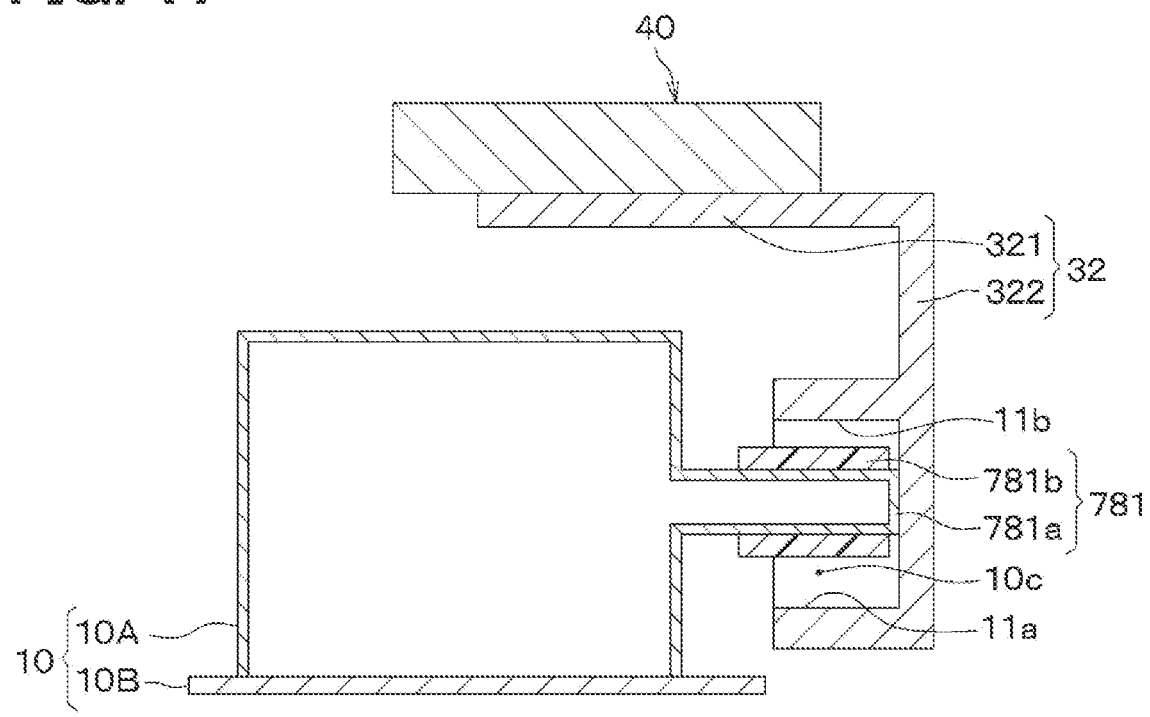
FIG. 17 is a cross-sectional view showing a configuration in which a stopper groove and an inner wall are provided in an arm and a releasing stopper is provided in a housing of a pedal device according to a ninth embodiment, and corresponding to FIG. 5.

FIG. 17 is a cross-sectional view showing the stopper groove 10c and the release stopper 781 of a pedal device 1 in the present embodiment.

The arm 32 has the stopper groove 10c and inner walls 11a and 111b formed thereon. The inner wall 11a is provided on one side of the stopper groove 10c in the circumferential direction. The inner wall 111b is provided on the other side of the stopper groove 10c in the circumferential direction.

The release stopper 781 is provided on the housing 10. The release stopper 781 is provided in the stopper groove 10c of the arm 32.

Next, the operation of the pedal device 1 of the present embodiment will be described with reference to FIG. 17.

First, when a pedal 40 is released from the foot of a driver 81, the application of the pedaling force of the driver 81 to the pedal 40 stops. Then, in a state in which the elastic force of the plurality of springs in a reaction force generation mechanism 60 is applied to the pedal 40 via a rod 76 on the other side in the circumferential direction Sh, the release stopper 781 abuts against the inner wall 11a of the stopper groove 10c (i.e., the stopper). Therefore, the pedal 40 is stopped at the minimum rotation position.

Thereafter, when the pedaling force of the driver 81 is applied to the pedal 40, the pedal 40, a rotating shaft 31 and the arm 32 swing about a pedal axis CL. When the pedal 40 further swings, the release stopper 781 abuts against the inner wall 11b of the stopper groove 10c, and the pedal 40 stops in the maximum pedaled state.

According to the present embodiment described above, in the pedal device 1, the stopper groove 10c and the inner walls 11a and 11b are provided on the arm 32, and the release stopper 781 is provided on the housing 10. Therefore, in the pedal device 1 of the present embodiment as well, corresponding effects as in the eighth embodiment are achievable.

Other Embodiments (1) In the first to eighth embodiments, an example in which the pedal device 1 is mounted on the automobile 80 as a vehicle has been described. However, the present disclosure is not limited to the above, and a pedal device 1 may be mounted on a vehicle such as a train. The pedal device 1 may also be mounted on moving objects such as manned drones, helicopters, and airplanes, or may also be mounted on various industrial equipment such as competition equipment used for e-sports, amusement equipment, machine tools or the like.

(2) In the first to eighth embodiments, an example in which the pedal device 1 is provided in the automobile 80 as a brake pedal device has been described. However, the present disclosure is not limited to the above, and a pedal device 1 may be provided in an automobile 80 as an accelerator pedal device, or the pedal device 1 may be provided in the automobile 80 as a clutch pedal device.

(3) In the above-described first to eighth embodiments, an examples in which the pedal device 1 is arranged on the floor 2 or the dash panel in the vehicle has been described. However, the present disclosure is not limited to the above, and a pedal device 1 may be arranged on an upright wall.

(4) In the above-described first to eighth embodiments, an example using the plate-shaped pedal 40 has been described. However, the present disclosure is not limited to the above, and a pedal 40 having a shape other than the plate shape may also be used.

(5) In the first to eighth embodiments, an example in which the arms 32, 32A, 32B are directly connected to the pedal 40 has been described. However, the present disclosure is not limited to the above, and arms 32, 32A, 32B are connected to a pedal 40 via other member(s).

(6) The present disclosure is not limited to the above-described embodiments, and can be appropriately modified. The above embodiments are not independent of each other, and can be appropriately combined together except when the combination is obviously impossible. Further, individual elements or features of a particular embodiment are not necessarily essential unless it is specifically stated that the elements or the features are essential in the foregoing description, or unless the elements or the features are obviously essential in principle. Further, in each of the embodiments described above, when numeric values such as the number of elements, values, quantity, range, or the like regarding the embodiment are referred to, except in case where the numeric values are expressly indispensable in particular, and in case where the numeric values are obviously limited to a specific number in principle, or the like, the present disclosure is not limited to the specific number. Further, when referring to a shape, positional relationship or the like of a claim element, which is referred to in the embodiments described above, except for a case in which the configuration is explicitly limited to a specific shape, and/or positional relationship or except for a case in which the configuration is limited to a specific shape, positional relationship or the like in principle, such a specific shape, and/or positional relationship is not a limiting one. Further, in each of the above-described embodiments, in case where it is described that external environmental information of a vehicle (for example, humidity outside the vehicle) is acquired from a sensor, it is also possible to eliminate the sensor and receive the external environmental information from a server or a cloud outside the vehicle. Alternatively, it is possible to eliminate such a sensor, and to acquire related information related to the external environmental information from a server or a cloud outside the vehicle, and to estimate the external environmental information from the acquired related information.

What is claimed is:

1. A pedal device to be pedaled by a user, the pedal device comprising:
    a pedal supported to be swingable about an axis and to swing toward one side in a circumferential direction about the axis when being pedaled by the user;
    a housing;
    a reaction force generation portion disposed in the housing and to apply a force to the pedal toward an another side in the circumferential direction; and
    a stopper arranged outside the housing, to swing about the axis together with the pedal while being supported by the pedal, and to stop the pedal by contacting the housing in a non- pedaled state in which the pedal is not pedaled by the user; and
    an arm configured to swing about the axis together with the pedal, wherein
    the arm is provided independently from the pedal, and
    the stopper is provided on the arm.

2. The pedal device according to claim 1, wherein the arm is connected to the pedal.

3. The pedal device according to claim 1, wherein the stopper and the arm constitute an integrally-molded one-piece object.

4. The pedal device according to claim 1, further comprising:
    a rotating shaft extending in an axial direction of the axis, wherein the pedal is supported via the rotating shaft to be swingable about the axis.

5. The pedal device according to claim 4, wherein the rotating shaft is connected to the arm.

6. The pedal device according to claim 4, wherein the pedal, the housing, the reaction force generation portion, and the stopper are mounted on a vehicle, the reaction force generation portion is arranged on a front side of the rotating shaft in a travel direction of the vehicle, and
the stopper is arranged on the front side of the rotating shaft in the travel direction of the vehicle.

7. The pedal device according to claim 1, wherein one of the housing or the stopper is provided with a cushioning member configured to cushion an impact generated between the stopper and the housing when the pedal is stopped.

8. The pedal device according to claim 7, wherein the cushioning member is made of a resin material.

9. The pedal device according to claim 1, wherein the stopper includes a metal component made of a metal material.

10. The pedal device according to claim 1, wherein the stopper stops the pedal by contacting the housing when the pedal is fully depressed by the user.

11. The pedal device according to claim 1, wherein the pedal constitutes an organ pedal device.

12. The pedal device according to claim 1, wherein a portion of the pedal that is configured to be stepped on by the user is arranged above a swing center of the pedal when the pedal is mounted on a vehicle.

13. A pedal device to be pedaled by a user, the pedal device comprising:
   a pedal supported to be swingable about an axis and to swing toward one side in a circumferential direction about the axis when being pedaled by the user;
   a housing;
   a reaction force generation portion disposed in the housing and to apply a force to the pedal toward an another side in the circumferential direction; and
   a stopper arranged outside the housing, to swing about the axis together with the pedal while being supported by the pedal, and to stop the pedal by contacting the housing in a non-pedaled state which the pedal is not pedaled by the user;
   wherein the stopper includes a stopper shaft and a ring formed in a ring shape and covering the stopper shaft from an outer periphery side by centering on an axis of the shaft.

14. The pedal device according to claim 13, wherein the ring is provided with a through hole penetrating through the ring along the axial direction of the axis of the stopper shaft, and
the ring is elastically deformed to apply elastic force to the stopper shaft in a state where the stopper shaft is inserted into the through hole of the ring.

\* \* \* \* \*